(12) United States Patent
Fukuda

(10) Patent No.: US 6,857,070 B1
(45) Date of Patent: Feb. 15, 2005

(54) DATA PROCESSING METHOD AND APPARATUS, AND STORAGE MEDIUM CAPABLE OF BEING READ BY A COMPUTER

(75) Inventor: Yasuo Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 914 days.

(21) Appl. No.: 09/698,239

(22) Filed: Oct. 30, 2000

(30) Foreign Application Priority Data

Nov. 5, 1999 (JP) ............................................. 11-315054

(51) Int. Cl.$^7$ ................................................. G06F 11/30
(52) U.S. Cl. ....................... 713/153; 713/171; 713/200; 713/201
(58) Field of Search ................................ 713/153, 171, 713/200, 201

(56) References Cited

U.S. PATENT DOCUMENTS 6,343,318 B1 * 1/2002 Hawkins et al. ............ 709/219
6,363,479 B1 * 3/2002 Godfrey et al. ............. 713/160

* cited by examiner

*Primary Examiner*—Thomas R. Peeso
(74) *Attorney, Agent, or Firm*—Fitzpatrick, Cella, Harper & Scinto

(57) ABSTRACT

In order to prevent manipulation of a specific portion of XML (Extensible Markup Language) data, data not to be manipulated is extracted from the XML data, the extracted data is encoded using a secret key of a public-key cryptographic system, the encoded data is returned to the XML data, an "encrypt-privatekey" property is given to a tag of the XML data, and a URL (Universal Resource Locator) data, serving as a location of reference of a public key corresponding to the secret key is inserted as the value of the property. If the encoded data can be decoded using the public key acquired from the URL data, it is possible to confirm that the decoded data is data formed by a person having the secret key corresponding to the public key, and that the decoded contents are not manipulated.

23 Claims, 9 Drawing Sheets

```
1:    <? XML  version = "1.0"? >
2:    <! DOCTYPE SomeXML SYSTEM "SomeXML.dtd" >
3:    <SomeXML>
4:       <Author>
5:       Yasuo FUKUDA
6:       </ Author>
7:       <SomeTag>
8:          <SomeDate>....</ SomeDate>
9:       </ SomeTag>
10:   </ SomeXML>
```

FIG.3

```
1:   <? XML  version = "1.0"?>
2:   <! DOCTYPE SomeXML SYSTEM "SomeXML.dtd" >
3:   <SomeXML>
4:      <Author encrypt - privatekey = "http//key.some.domain/yasuo.key">
5:      XXXXXXXXXXXXXXXXXXXXXXXX
6:      </ Author>
7:      <SomeTag>
8:         <SomeDate>....</ SomeDate>
9:      </ SomeTag>
10:  </ SomeXML>
```

FIG.4

```
1:    <? XML  version = "1.0"?>
2:    <! DOCTYPE SomeXML SYSTEM "SomeXML.dtd" >
3:    <SomeXML>
4:        <Author>
5:            <encrypt - privatekey>
6:                http : // key.some.domain / yasuo.key
7:            </ encrypt - privatekey>
8:            <encrypt - string>
9:    XXXXXXXXXXXXXXXXXXXXXXXX
10:           </ encrypt>
11:       </ Author>
12:       <SomeTag>
13:           <SomeDate>....</ SomeDate>
14:       </ SomeTag>
15:   </ SomeXML>
```

DATA PROCESSING METHOD AND APPARATUS, AND STORAGE MEDIUM CAPABLE OF BEING READ BY A COMPUTER

BACKGROUND OF THE INVENTION

1. Field of the Invention

The present invention relates to data processing, and more particularly, to processing for preventing manipulation of markup data.

2. Description of the Related Art

Markup data in which the attribute of each element is defined using a markup language has been used as data of a document or the like dealt with in a computer. An SGML (Standard Generalized Markup Language), an HTML (Hyper Text Markup Language) or the like is used as such a markup language.

Recently, various data formats using an XML (Extensible Markup Language), serving as such a markup language, have been proposed.

The XML represents a data item using a tag including "<" and ">", in a readable data format described by text data, such as "<Tag>" or "</Tag>", and can represent various data by surrounding another data by such tags so as to provide a nest structure. When data is not included within a data item represented by a tag, a description, such as "<Tag/>", may be provided. It is also possible to describe characteristic data relating to a tag, which is called a property, within the tag. Such an approach is realized, for example, by interpolating a character string in the form of "property name="value"" in the tag by separating the character string from the tag name ("Tag" in this example) with a blank character, such as "<Tag prop="Property"> . . . </Tag>".

The XML also has a data block called DTD (Document Type Definition), in order to specify the structure of the tag in succeeding actual XML data (Body).

The XML also can add information when rendering the data using style sheets, such as an XSL (Extensible Style Language) or CSS (Cascading Style Sheets), and define a hyperlink between data by using XLink or XPointer.

There is an SMIL (Synchronized Multimedia Integration Language), an SVG or the like as an example of the data format using the XML.

As described above, since the XML is a data format including text data, it can be easily formed or edited using ordinary document editing software (a text editor or the like). This is advantageous from the viewpoint of easing handling of the XML.

However, for example, even if data not to be manipulated, such as information relating to the copyright (the author's name, the registration number of the copyright, or the like) is partly included in the data, the portion of the copyright data can be easily changed, i.e., easily manipulated by a third party.

In order to prevent the manipulation of the data, an approach can, for example, be considered in which the entire data is encoded using a secret key of a public-key cryptographic system). In such an approach, however, in order to read encoded data, it is necessary to provide software and a public key corresponding to the public-key cryptographic system, and the data becomes entirely meaningless for a person who does not have such items. When merely reading data without confirming information relating to the copyright, it is desirable to be able to easily refer to the contents of the data without such limitation.

It is also desirable that the procedure is simple for a person who confirms information relating to the copyright.

SUMMARY OF THE INVENTION

It is an object of the present invention to prevent manipulation of partial data not to be manipulated, without influencing reference to other data portions.

It is another object of the present invention to be able to easily confirm the contents of partial data for which manipulation is prevented.

According to one aspect, the present invention which achieves these objectives relates to a data processing method for processing markup data tagged according to a markup language. The method includes an extraction step of extracting partial data from provided markup data, an encoding step of generating encoded data by encoding the data extracted in the extraction step using a secret key in a public-key cryptographic system, a key-reference-data formation step of forming key-reference data for referably specifying a public key corresponding to the secret key, and a generation step of generating new markup data by identifiably describing the encoded data and the key-reference data using tags and adding the described data to the markup data remaining after extracting the partial data in the extraction step.

According to another aspect, the present invention which achieves these objectives relates to a data processing method for processing markup data tagged according to a markup language. The method includes a data extraction step of extracting encoded data encoded using a secret key in a public-key cryptographic system and key reference data for referably specifying a public key corresponding to the secret key, from markup data to be processed, based on a predetermined tag, and a public-key acquisition step of acquiring the public key based on the key-reference data, and a decoding step of decoding the encoded data using the acquired public key.

According to still another aspect, the present invention which achieves these objectives relates to a data processing apparatus for processing markup data tagged according to a markup language. The apparatus includes extraction means for extracting partial data from provided markup data, encoding means for generating encoded data by encoding the data extracted by the extraction means using a secret key in a public-key cryptographic system, key-reference-data formation means for forming key-reference data for referably specifying a public key corresponding to the secret key, and generation means for generating new markup data by identifiably describing the encoded data and the key-reference data using tags and adding the described data to the markup data remaining after extracting the partial data by the extraction means.

According to yet another aspect, the present invention which achieves these objectives relates to a data processing apparatus for processing markup data tagged according to a markup language. The apparatus includes data extraction means for extracting encoded data encoded using a secret key in a public-key cryptographic system and key-reference-data for referably specifying a public key corresponding to the secret key, from markup data to be processed, based on a predetermined tag, and public-key acquisition means for acquiring the public key based on the key-reference data, and decoding means for decoding the encoded data using the acquired public key.

According to a further aspect, the present invention which achieves these objectives relates to a storage medium storing a data processing program for processing markup data tagged according to a markup language so as to be readable by a computer. The data processing program includes an extraction step of extracting partial data from provided markup data, an encoding step of generating encoded data by encoding the data extracted in the extraction step using a secret key in a public-key cryptographic system, a key-reference-data formation step of forming key-reference data for referably specifying a public key corresponding to the secret key, and a generation step of generating new markup data by identifiably describing the encoded data and the key-reference data using tags and adding the described data to the markup data remaining after extracting the partial data in the extraction step.

According to a further aspect, the present invention which achieves these objectives relates to a storage medium storing a data processing program for processing markup data tagged according to a markup language so as to be readable by a computer. The data processing program includes a data extraction step of extracting encoded data encoded using a secret key in a public-key cryptographic system and key reference data for referably specifying a public key corresponding to the secret key, from markup data to be processed, based on a predetermined tag, and a public-key acquisition step of acquiring the public key based on the key-reference data, and a decoding step of decoding the encoded data using the acquired public key.

According to a further aspect, the present invention which achieves these objectives relates to a storage medium storing markup data tagged according to a markup language so as to be readable by a computer. The markup data includes first data in which encoded data encoded using a secret key in a public-key cryptographic system is identifiably described using a first tag, and second data in which key-reference data for referably specifying a public key for decoding the encoded data is identifiably described using a second tag and which corresponds to the first data.

Other objectives and advantages besides those discussed above shall be apparent to those skilled in the art from the description of preferred embodiments of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 is a diagram illustrating ordinary XML data;

FIG. 4 is a diagram illustrating an example of XML data subjected to manipulation preventing processing;

FIG. 5 is another example of XML data subjected to manipulation preventing processing;

DESCRIPTION OF THE PREFERRED EMBODIMENTS

First Embodiment

A first preferred embodiment of the present invention will now be described in detail with reference to the drawings.

Figure 1:
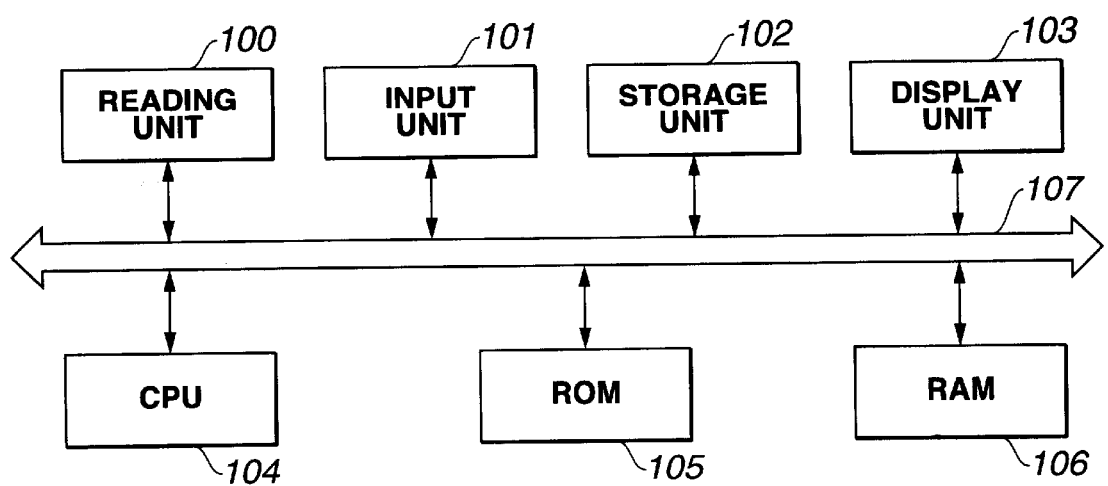
FIG. 1 is a block diagram illustrating the configuration of a data processing apparatus according to an embodiment of the present invention.

FIG. 1 is a block diagram illustrating the configuration of a data processing apparatus according to the first embodiment.

In FIG. 1, a reading unit 100 includes a scanner and the like, and optically reads an image from a medium, such as paper or the like. An input unit 101 includes a keyboard, a pointing device and the like, and is used by the user for inputting data. A storage unit 102 is configured by a storage device which uses a hard disk or the like as a storage medium, and stores binary data and metadata. A display unit 103 is configured by a CRT (cathode-ray tube), a liquid-crystal display or the like, and displays binary data stored in the storage unit 102 or image data read by the reading unit 100.

Figure 2:
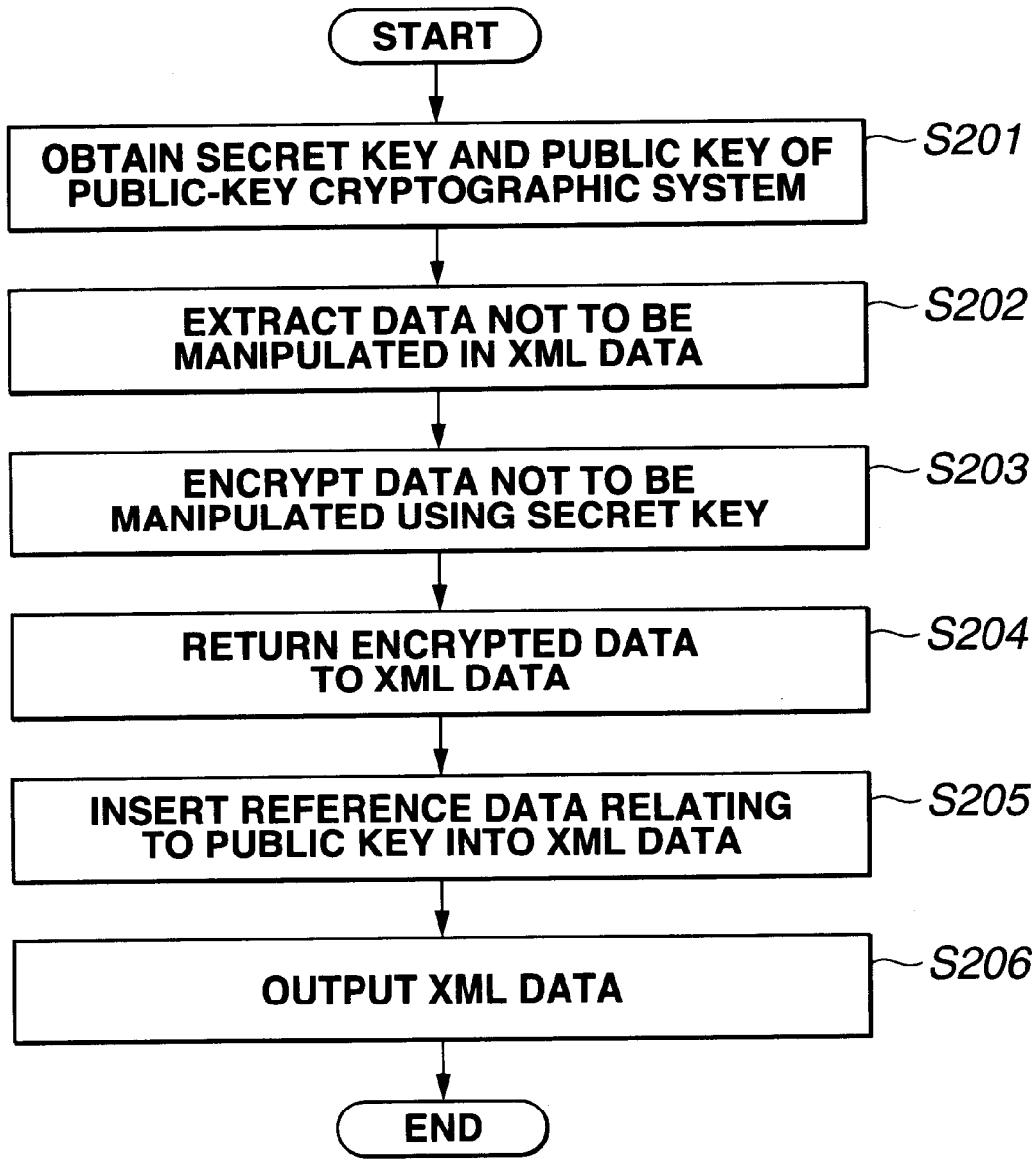
FIG. 2 is a flowchart illustrating a data preserving procedure for manipulation preventing processing.

A CPU (central processing unit) 104 controls the respective units of the apparatus, and realizes various types of processing by executing corresponding programs. A ROM (read-only memory) 105 stores fixed data and programs. In the first embodiment, a control program for realizing a processing procedure to be described with reference to FIG. 2 is also stored in the ROM 105. A RAM (random access memory) 106 provides a memory and an operational region necessary for that processing. A bus 107 interconnects the respective units of the apparatus.

Various other components may be provided in the data processing apparatus of the first embodiment. However, since these components are not main components in this invention, a description thereof will be omitted.

Next, a description will be provided of the operation in a method for preserving data not to be manipulated in the data processing apparatus having the above-described configuration, with reference to the flowchart shown in FIG. 2.

In FIG. 2, in step S201, a secret key and a public key of a public-key cryptographic system are obtained. A known public-key cryptographic system may be used as this system. The known public-key cryptographic system is realized by using a pair of different keys, i.e., a secret key and a public key. Data encoded using the public key can be decoded only by the secret key, and data encoded by the secret key can be decoded by the public key. This system has the feature that it is very difficult to estimate the secret key from the public key.

According to the above-described property, if a public key paired with a secret key secretly possessed by a person is opened and certain encoded data can be decoded using the open key, it is guaranteed that the decoded contents are encoded by the secret key paired with the public key, i.e., that the decoded contents coincide with the contents confirmed by the owner of the secret key.

A mechanism for generating such secret key and public key may be realized, for example, by software provided within the data processing apparatus of the first embodiment. Alternatively, the formation of the keys may be requested by communicating with a server computer called an authentication station, and the keys generated by the authentication station may be received. The public key is placed at a location which can be referred to from another person.

Then, in step S202, data not be manipulated is extracted from XML data. The XML data is usually subjected to syntax checking and analyzed according to a program called a parser, and is represented in the form of a tree structure or the like within the program. Data corresponding to each tag of the XML data represented by the tree structure or the like can be easily subjected to various types of processing, such as extraction, rewriting, addition, deletion and the like, via a DOM (Document Object Model) interface or the like. Any means other than the DOM interface may be used, provided that the same processing can be performed.

FIG. 3 illustrates a part of an XML file. In FIG. 3, the first line indicates XML declaration, the second line indicates document type declaration, and the third through tenth lines indicate document elements. It is assumed that the portion "Yasuo FUKUDA" on the fifth line surrounded by <Auther> and </Auther> tags on the fourth and sixth lines, respectively, which indicates the author, is a portion not to be manipulated.

Then, in step S203, the data extracted in step S202 is encoded using the secret key obtained in step S201. Since the encoded data generated in step S203 is encoded using the secret key, it can be decoded using the public key, as described above.

Then, in step S204, the encoded data is returned to the XML data. Then, in step S205, reference data relating to the public key is inserted into the XML data. It is assumed that the reference data is a URL (Universal Resource Locator) where the public key is referably registered. These processes are performed, for example, via the DOM interface or the like in the same manner as described above. Finally, in step S206, the generated XML data is output.

FIG. 4 is an XML file after the above-described processing has been performed for the XML file shown in FIG. 3. By comparing this file with the file shown in FIG. 3, it can be understood that the fourth line has been rewritten. This line indicates an encoded character string obtained after encoding the original fourth line using the secret key in step S203. It can also be understood that as the result of the processing in step S204, an "encrypt-privatekey" property has been inserted into the <Auther> tag on the original fourth line together with a value "http://key.some.domain/yasuo.key". This "http://key.some.domain/yasuo.key" is a URL for referring to the public key. Although in the first embodiment, the case of describing data necessary for referring to the public key using a URL, any other data (such as ID or the like) which can refer to the public key may also be used. According to this property, it can be understood that the contents surrounded by <Auther> tags are encoded.

Although in the first embodiment, encoded data is surrounded by tags, any other appropriate approach may also be adopted. For example, encoded data may be represented in the form of a tag's property.

Although in the first embodiment, a property is used for representing reference data relating to a public key, the reference data is not necessarily represented by a property. For example, a tag may be used. FIG. 5 illustrates an XML file in which a tag is used for representing reference data relating to the public key. In this case, the reference data relating to the public key is represented by the contents of a tag <encrypt-privatekey>, and corresponding encoded data is represented by the contents of the succeeding tag <encrypt-string>.

The element of a tag used in the first embodiment, for example, "SomeXML" or "Author" shown in FIG. 3, is specified by a DTD. Whether or not a tag has a property, and what property is possessed by the tag depend on the DTD.

Accordingly, what type of tag or property is to be used in order to represent encoded data or reference data relating to a public key is not the gist of the present invention. That is, any tag or property other than the above-described one may be applied to the present invention, provided that it includes a character string encoded using a secret key and data indicating reference to a public key corresponding to the secret key.

If a plurality of data not to be manipulated are present, the processing from step S201 to step S205 is repeated by necessary times. If a secret key and a public key may be common to the plurality of data not to be manipulated, it is necessary to execute step S201 only at the first time. Then, the processing from step S202 to step S205 may be repeated by necessary times. The order of these steps may be appropriately rearranged so as to be able to realize the objects of the present invention.

Figure 6:
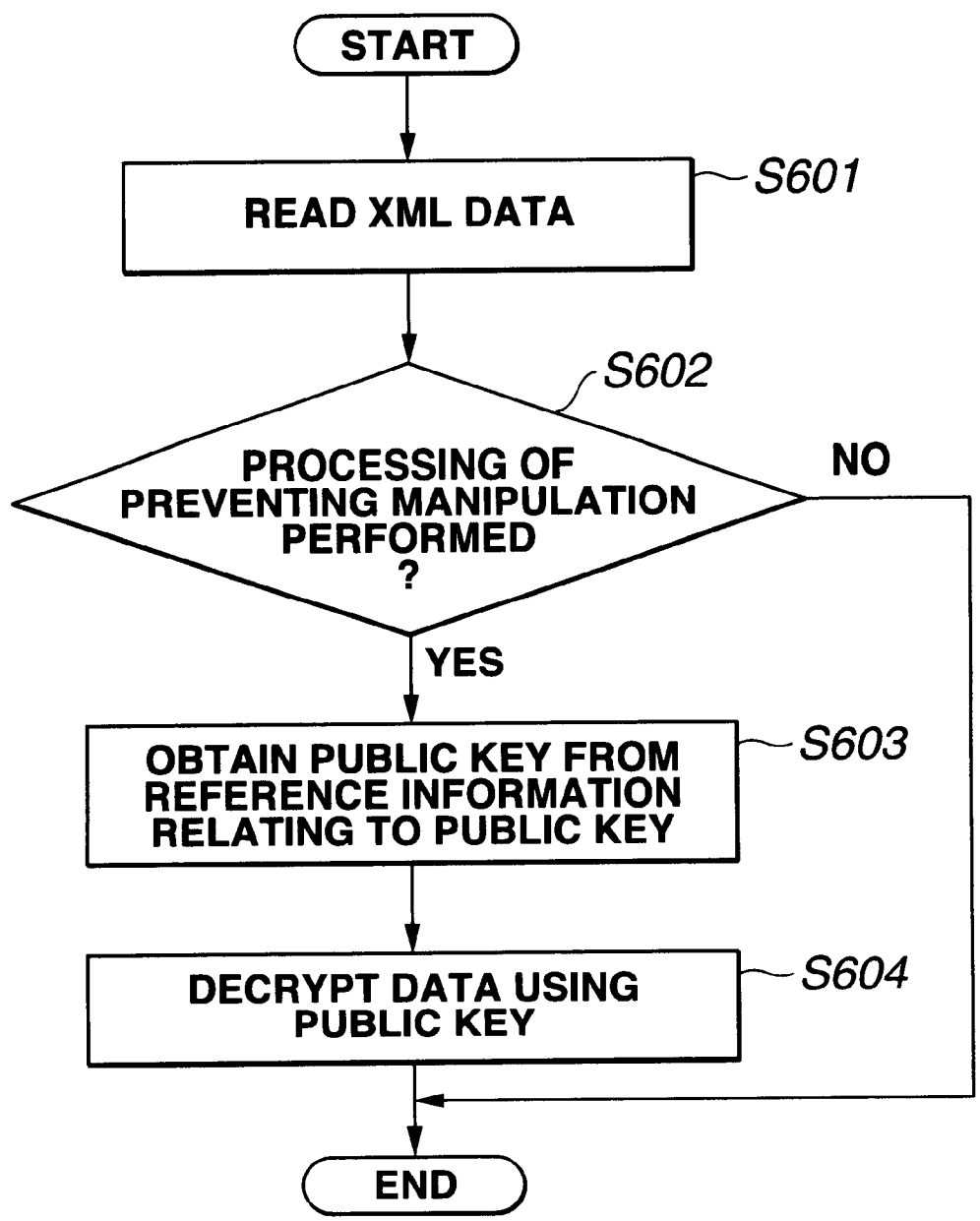
FIG. 6 is a flowchart illustrating a method for reading data subjected to manipulation preventing processing.

Next, document reading processing according to the first embodiment will be described with reference to FIG. 6.

First, in step S601, a target XML file is read. The read XML file is subjected to syntax checking and analyzed by a parser and is represented, for example, in the form of a tree structure, and can be easily subjected to processing, such as extraction, rewriting, addition, deletion or the like, via a DOM interface or the like.

Then, in step S602, it is determined if processing of preventing manipulation according to the first embodiment has been performed for this XML file. This determination can be easily performed by searching for data which coincides with the definition indicating the encoded character string by checking a tag or its property.

If the result of the determination in step S602 is negative, for example, in the case of the XML data shown in FIG. 3, no action is performed. If the result of the determination in step S602 is affirmative, for example, in the case of the XML data shown in FIG. 4 or 5, then, in step S603, a public key is acquired using reference information relating to the public key added to the file. Then, in step S604, an encoded portion is decoded using the public key.

As described above, data decoded using a public key can be known to be decoded using a secret key corresponding to the public key, based on the feature of the public-key cryptographic system. Hence, it can be confirmed that the encoded portion is data formed by a person having the secret key. Since the entire data is data conforming to an ordinary XML data format, portions other than the encoded portion can be read by a known XML reading apparatus or the like, without using the data processing apparatus according to the first embodiment.

Second Embodiment

In a second embodiment of the present invention, a case of connecting data in which manipulation is prevented to binary data will be described. The binary data in this case is image data, sound data, moving-image data or the like.

Figure 7:
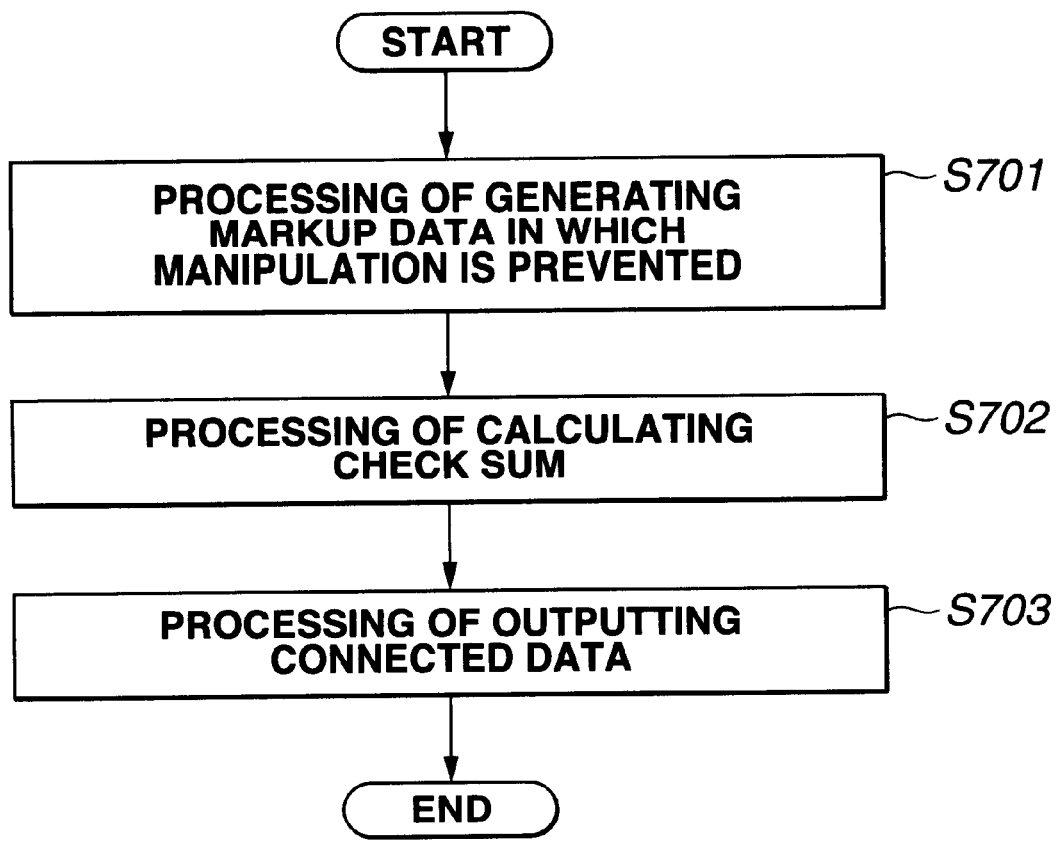
FIG. 7 is a flowchart illustrating a method for preserving data subjected to manipulation preventing processing and connected to binary data.

FIG. 7 is a flowchart illustrating processing when connecting data to binary data.

First, in step S701, markup data in which manipulation is prevented is generated. Since the processing in step S701 has been described in the first embodiment, further description thereof will be omitted.

Then, in step S702, a check sum of the markup data in which manipulation is prevented is calculated. The calculation of the check sum may be performed using a known mechanism. For example, the number of bytes, the number of characters, the number of words, the number of lines, the number of tags, or the like of the markup data may be calculated as the check sum.

In step S703, data obtained by connecting the markup data in which manipulation is prevented and the check sum to the binary data is output.

At that time, the order of connection of these data, i.e., the data format, is arbitrary. In the second embodiment, the data are connected, for example, in the order shown in FIG. 9.

Figure 8:
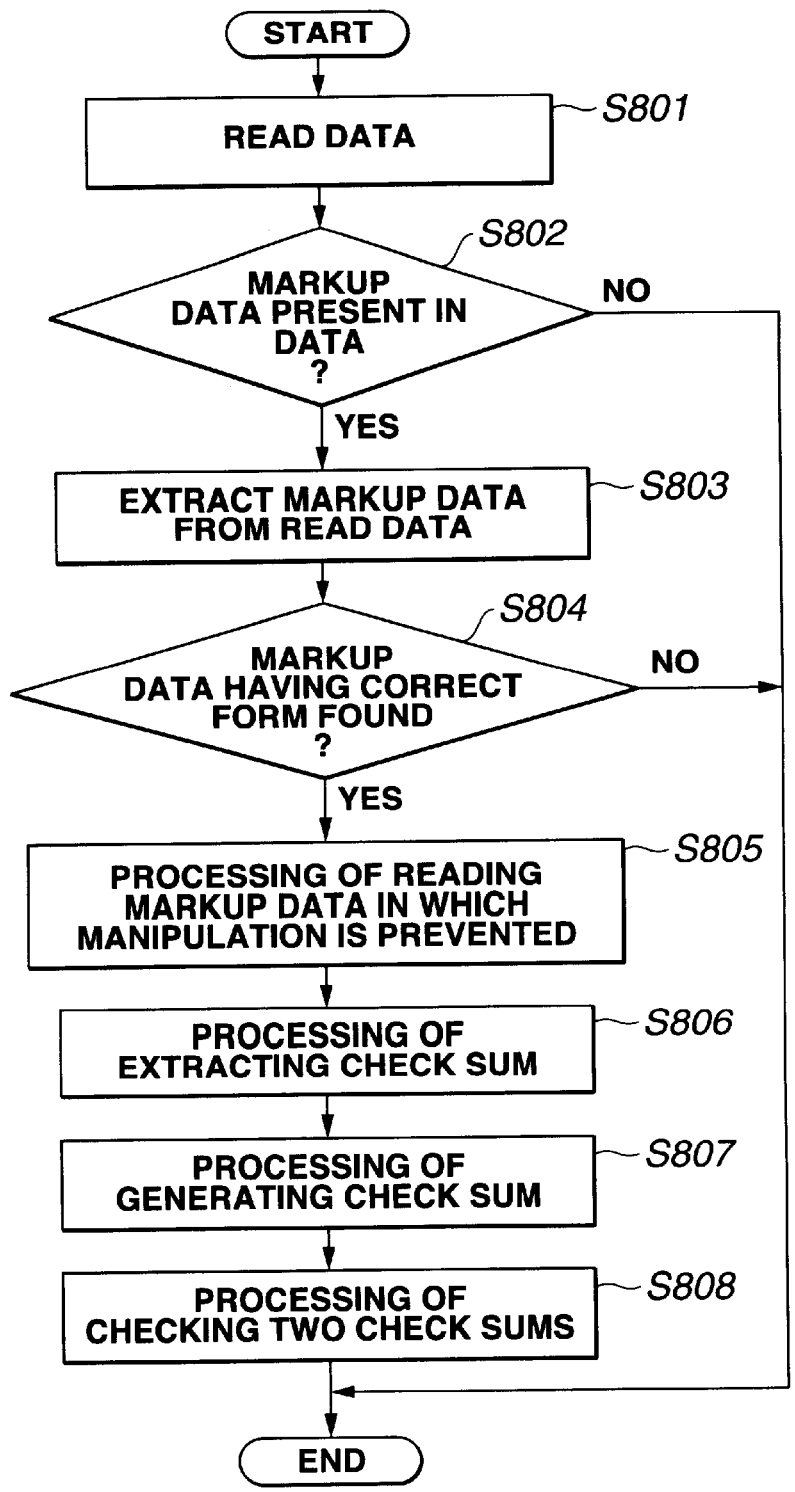
FIG. 8 is a flowchart illustrating a method for reading data subjected to manipulation preventing processing and connected to binary data.

FIG. 8 is a flowchart illustrating processing when reading markup data connected to binary data.

First, in step S801, the entire data is read and developed within a memory. Then, in step S802, it is determined if markup data is present within the read data. This determination depends on the format of the data. In the second embodiment, a case in which respective data are stored in the order of the above-described data output method (see FIG. 9) will be described.

Figure 9:
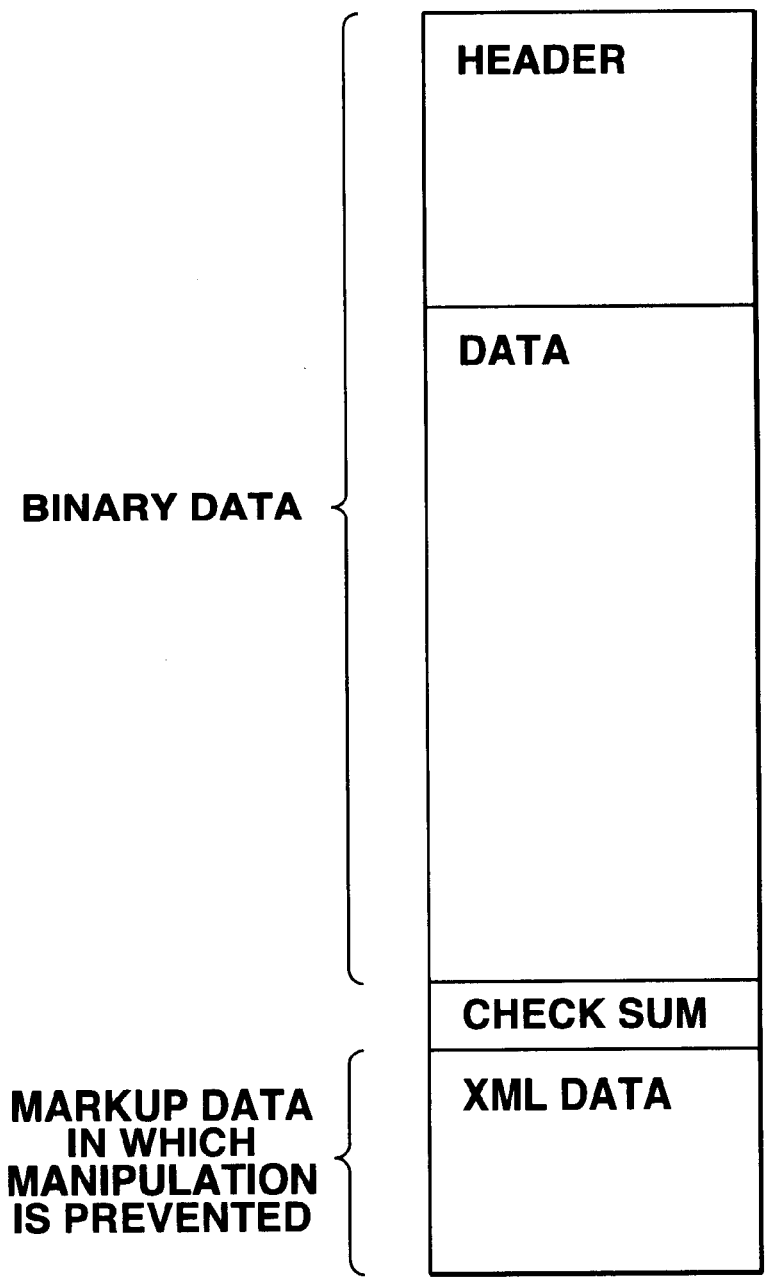
FIG. 9 is a diagram illustrating an example of the configuration of data subjected to manipulation preventing processing and connected to binary data.

In the case of the data format shown in FIG. 9, it can be easily determined if markup data is connected by checking from the rear portion of the data. That is, since connected markup data is text data as described in FIG. 4 or 5, whether or not a tag such as "</SomeXML>" on the tenth line in FIG. 4 is present may be determined from the rear portion of the data.

Then, in step S803, markup data is extracted from binary data. In the above-described case, this is realized by searching for a tag "<SomeXML>" correctly corresponding to the already found "</SomeXML>". Then, in step S804, the markup data is verified. That is, it is determined if a tag "<SomeXML>" is present, and if data between "<SomeXML>" and "</SomeXML>" is correct as a document as a markup language when "<SomeXML>" has been found. This verification of the document may be performed by a known XML parser or the like. If the result of the determination in step S804 is negative, the reading processing results in error, and the process is terminated.

In step S805, the markup language extracted in step S803 is checked, and if the extracted markup language is subjected to manipulation preventing processing, processing of reading markup data in which manipulation is prevented is performed. Since this processing has been described in detail in the first embodiment, further description thereof will be omitted.

Then, in step S806, a check sum is extracted from the read data.

Then, in step S807, a check sum is generated from the read markup data in which manipulation is prevented. Finally, in step S808, the check sum extracted in step S806 is compared with the check sum generated in step S807. If the two check sums coincide with each other, it can be understood that the markup data having the function of preventing manipulation of partial data contained in the read data is not manipulated. If the two check sums do not coincide with each other, it can be understood that the markup data having the function of preventing manipulation of partial data contained in the read data is manipulated.

Although in the foregoing embodiments, the case of using the XML as the markup language has been described, the present invention is not limited to such an approach. For example, any other markup language defined using the XML may be used, or the SGML or the HTML may be used.

According to the above-described embodiments, by encoding a data item not to be manipulated using a secret key and adding information for referring to a public key, data manipulation for a specific portion of a markup language can be prevented.

When causing application software which does not correspond to a cryptographic system to process data in order to encode only a specific portion of the data, or in an environment in which a public key cannot be referred to for some reason, it is also possible to refer to and utilize portions other than the specific portion which are not encoded.

The present invention may be applied to an apparatus comprising a single unit, or to a system comprising a plurality of apparatuses. The objects of the present invention may also be achieved by supplying an apparatus or a system with a storage medium storing program codes of software for realizing the functions of the above-described embodiments, and reading and executing the program codes stored in the storage medium by means of a computer within the apparatus or the system.

The present invention may be applied not only to a case in which the functions of the above-described embodiments are directly realized by reading and executing program codes stored in a storage medium by means of a computer within an apparatus or a system, but also to a case in which the functions of the above-described embodiments are realized according to processing of an OS (operating system) or the like operating in the computer, based on instructions of the program codes.

In such cases, the storage medium storing the program codes constitutes the present invention.

The individual components designated by blocks in the drawings are all well known in the data processing method and apparatus arts and their specific construction and operation are not critical to the operation or the best mode for carrying out the invention.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. A data processing method for processing markup data tagged according to a markup language, said method comprising:
    an extraction step of extracting partial data from provided markup data;
    an encoding step of generating encoded data by encoding the data extracted in said extraction step using a secret key in a public-key cryptographic system;
    a key-reference-data formation step of forming key-reference data for referably specifying a public key corresponding to the secret key; and
    a generation step of generating new markup data by identifiably describing the encoded data and the key-reference data using tags, and adding the described data to the markup data remaining after extracting the partial data in said extraction step.

2. A data processing method according to claim 1, further comprising a key generation step of generating the secret key and the public key.

3. A data processing method according to claim 1, wherein in said generation step, the encoded data is described by surrounding it with tags.

4. A data processing method according to claim 1, wherein in said generation step, the encoded data is described as a tag's property.

5. A data processing method according to claim 1, wherein in said generation step, the key-reference data is described as a tag's property.

6. A data processing method according to claim 1, wherein in said generation step, the key-reference data is described by surrounding it with tags.

7. A data processing method according to claim 1, wherein the key-reference data is data indicating a location where the public key can be referred to.

8. A data processing method according to claim 1, wherein the key-reference data is data for identifying the public key.

9. A data processing method according to claim 1, wherein the markup language is one of an XML (Extensible Markup Language), another markup language defined using the XML, an SGML (Standard Generalized Markup Language), and an HTML (Hyper-Text Markup Language).

10. A data processing method according to claim 1, further comprising:
a check-sum calculation step of calculating a check sum of the markup data generated in said generation step; and
a data connection step of connecting the generated markup data and the check sum to binary data.

11. A data processing method according to claim 10, wherein in said data connection step, the markup data is connected after the binary data.

12. A data processing method according to claim 10, wherein the binary data is image data, sound data, or moving-image data.

13. A data processing method according to claim 10, wherein the check sum is one of a number of bytes, a number of characters, a number of words, and a number of lines of the markup data, and a number of tags included in the markup data.

14. A data processing method for processing markup data tagged according to a markup language, said method comprising:
a data extraction step of extracting encoded data encoded using a secret key in a public-key cryptographic system and key-reference data for referably specifying a public key corresponding to the secret key, from markup data to be processed, based on a predetermined tag; and
a public-key acquisition step of acquiring the public key based on the key-reference data; and
a decoding step of decoding the encoded data using the acquired public key.

15. A data processing method according to claim 14, wherein in said data extraction step, data described by being surrounded by predetermined tags is extracted as the encoded data or the key-reference data.

16. A data processing method according to claim 14, wherein in said data extraction step, a value of a property of a predetermined tag is extracted as the encoded data or the key-reference data.

17. A data processing method according to claim 14, further comprising:
a binary-data reading step of reading binary data;
a markup-data extraction step of extracting the markup data to be processed from the binary data read in said binary-data reading step;
a check-sum extraction step of extracting a check sum from the binary data read in said binary-data reading step;
a check-sum calculation step of calculating a check sum of the markup data extracted in said markup-data extraction step; and
a manipulation determination step of determining whether or not manipulation of data is present by comparing the check sum extracted in said check-sum extraction step with the check sum calculated in said check-sum calculation step.

18. A data processing apparatus for processing markup data tagged according to a markup language, said apparatus comprising:
extraction means for extracting partial data from provided markup data;
encoding means for generating encoded data by encoding the data extracted by said extraction means using a secret key in a public-key cryptographic system;
key-reference-data formation means for forming key-reference data for referably specifying a public key corresponding to the secret key; and
generation means for generating new markup data by identifiably describing the encoded data and the key-reference data using tags and adding the described data to the markup data remaining after extracting the partial data by said extraction means.

19. A data processing apparatus for processing markup data tagged according to a markup language, said apparatus comprising:
data extraction means for extracting encoded data encoded using a secret key in a public-key cryptographic system and key-reference data for referably specifying a public key corresponding to the secret key, from markup data to be processed, based on a predetermined tag; and
public-key acquisition means for acquiring the public key based on the key-reference data; and
decoding means for decoding the encoded data using the acquired public key.

20. A storage medium storing a data processing program for processing markup data tagged according to a markup language so as to be readable by a computer, said data processing program comprising:
an extraction step of extracting partial data from provided markup data;
an encoding step of generating encoded data by encoding the data extracted in said extraction step using a secret key in a public-key cryptographic system;
a key-reference-data formation step of forming key-reference data for referably specifying a public key corresponding to the secret key; and
a generation step of generating new markup data by identifiably describing the encoded data and the key-reference data using tags and adding the described data to the markup data remaining after extracting the partial data in said extraction step.

21. A storage medium storing a data processing program for processing markup data tagged according to a markup language so as to be readable by a computer, said data processing program comprising:
a data extraction step of extracting encoded data encoded using a secret key in a public-key cryptographic system and key reference data for referably specifying a public key corresponding to the secret key, from markup data to be processed, based on a predetermined tag;
a public-key acquisition step of acquiring the public key based on the key-reference data; and
a decoding step of decoding the encoded data using the acquired public key.

22. A storage medium storing markup data tagged according to a markup language so as to be readable by a computer, said markup data comprising:

first data in which encoded data encoded using a secret key in a public-key cryptographic system is identifiably described using a first tag; and second data in which key-reference data for referably specifying a public key for decoding the encoded data is identifiably described using a second tag and which corresponds to the first data.

23. A storage medium according to claim 22, wherein a check sum of the markup data and bit data are connected to the markup data, and resultant data is stored so as to be readable by a computer.

* * * * *

UNITED STATES PATENT AND TRADEMARK OFFICE
CERTIFICATE OF CORRECTION

PATENT NO. : 6,857,070 B1
DATED : February 15, 2005
INVENTOR(S) : Fukuda

It is certified that error appears in the above-identified patent and that said Letters Patent is hereby corrected as shown below:

<u>Column 5,</u>
Line 1, "be" should be deleted.
Lines 16, 17, 41 and 49, "<Auther>" should read -- <Author> --.

Signed and Sealed this

Sixth Day of September, 2005

JON W. DUDAS
*Director of the United States Patent and Trademark Office*